(12) United States Patent
Biyani et al.

(10) Patent No.: US 8,300,803 B2
(45) Date of Patent: Oct. 30, 2012

(54) COOPERATIVE MIMO FOR ALIEN NOISE CANCELLATION (COMAC) FOR UPSTREAM VDSL SYSTEMS

(75) Inventors: Pravesh Biyani, Raipur (IN); Amitkumar Mahadevan, Eatontown, NJ (US); Patrick Duvaut, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 1239 days.

(21) Appl. No.: 12/100,253

(22) Filed: Apr. 9, 2008

(65) Prior Publication Data

US 2009/0257581 A1  Oct. 15, 2009

(51) Int. Cl.
H04M 9/00 (2006.01)
H04M 1/76 (2006.01)
H04M 7/00 (2006.01)

(52) U.S. Cl. .......................................... 379/417
(58) Field of Classification Search .................. 379/417; 370/201
See application file for complete search history.

(56) References Cited

U.S. PATENT DOCUMENTS

| | | | |
|---|---|---|---|
| 6,292,559 B1 | 9/2001 | Gaikwad et al. | |
| 6,990,196 B2 | 1/2006 | Zeng et al. | |
| 6,999,583 B2 | 2/2006 | Valenti et al. | |
| 7,023,908 B2 | 4/2006 | Nordstrom et al. | |
| 7,315,592 B2 | 1/2008 | Tsatsanis et al. | |
| 7,577,209 B2 | 8/2009 | Poon | |
| 2001/0004383 A1 | 6/2001 | Nordstrom et al. | |
| 2001/0055332 A1 | 12/2001 | Sadjadpour et al. | |
| 2003/0072380 A1 | 4/2003 | Huang | |
| 2003/0137925 A1 | 7/2003 | Zamir | |
| 2006/0002462 A1 | 1/2006 | Park | |
| 2006/0056522 A1 | 3/2006 | Tsatsanie et al. | |
| 2006/0227815 A1 | 10/2006 | Khan | |
| 2007/0004286 A1 | 1/2007 | Hobbel | |
| 2007/0110135 A1 | 5/2007 | Guess et al. | |
| 2009/0175156 A1* | 7/2009 | Xu ................................ 370/201 |

OTHER PUBLICATIONS

ISR and WO for related PCT Application No. PCT/US2008/080470 mailed Dec. 16, 2008.
ISR and WO for related PCT Application No. PCT/US2008/087906 mailed Feb. 13, 2009.
Benveniste, et al. "Adaptive Algorithms for Stochastic Approximations," Springer Verlag, New-York, 1990.
Bliss, et al., "Environmental Issues for MIMO Capacity" IEEE Transaction on Signal Processing, vol. 50, No. 9, pp. 2128-2142, Sep. 2002.
Cendrillon et al., "Improved Linear Crosstalk Precompensation for DSL," in Processing IEEE ICASSP, May 2004, pp. 1053-1056.
Cendrillon, et al., "Partial Crosstalk Cancellation for Upstream VDSL," EURASIP Journal on Applied Signal Processing, Mar. 3, 2003; vol. 10, pp. 1520-1535.

(Continued)

Primary Examiner — Alexander Jamal
(74) Attorney, Agent, or Firm — Mark J. Danielson; Pillsbury Winthrop Shaw Pittman LLP

(57) ABSTRACT

Included are embodiments for reducing alien crosstalk. At least one embodiment of a method includes receiving noise data associated with a first user signal on a first tone, receiving noise data associated with a second user signal on the first tone, and receiving at least one alien crosstalk canceller coefficient for the first user on the first tone. Some embodiments include applying the at least one alien crosstalk canceller coefficient to the second user signal to reduce alien crosstalk for the first user signal.

25 Claims, 10 Drawing Sheets

OTHER PUBLICATIONS

Duvaut, et al., "Adaptive Off-Diagonal MIMO Pre-coder (ODMP) for Downstream DSL Self FEXT Cancellation", Proceedings of the IEEE Global Telecommunications Conference, Globecom 2007, Washington DC, Nov. 26-30, 2007.

Duvaut, et al., Gvdsl: Answers to questions and concerns related to reporting the error(f) for Self FEXT cancellation, ITU Telecommunication Standardization Sector, Study Group 15, Napa Valley, CA, Apr. 16-20, 2007.

Duvaut, et al., "G.vdsl: Proposed Requirements on Back Channel for Estimating MIMO Channel in VDSL2", Conexant Systems Inc., CD-041, Denver, Colorado, Sep. 25-29, 2006.

Duvaut, et al., "Updated Proposal for Construction of a MIMO Channel Model for Evaluation of FEXT Cancellation Systems," Conexant Systems Inc., NIPPNAI- 2007-009R1, San Francisco, California, Dec. 5-7, 2006.

Duvaut, et al.,"G.vdsl: Using Error Samples for Downstream Self FEXT Cancellation Pre-coding in VDSL2," Conexant Systems Inc., SD-052, San Diego, California, Jan. 15-19, 2007.

Forouzan, et al., "Computationally Efficient Partial Crosstalk Cancellation in Fast Time-Varying DSL Crosstalk Environments", EURASIP Journal on Advances in Signal Processing, vol. 2007 Article ID 72041; Dec. 2006.

ITU-T, G.993.2, "Very High Speed Digital Subscriber Line Transceiver 2 (VDSL2)", Series G: Transmission Systems and Media, Digital Systems and Networks-Digital Sections and Digital Line System-Access Networks, Feb. 2006.

ITU-T, G. 993.5,"Self-FEXT Cancellation (Vectoring) for use with VDSL2 Transceivers", Series G: Transmission System and Media Digital Systems and Networks, Digital sections and digital line system-Access networks, Apr. 2010.

Ilani, Ishai, "Channel Estimation by "Abuse" of Receivers," Actelis Networks, NIPPNAI-098, Savannah, Georgia, Jun. 26-29, 2006.

Karipidis, et al., "Crosstalk Models for Short VDSL2 Lines from 30MHz Measured Data", Eurasip Journal on Applied Signal processing, vol. 2006, Aug. 2005; Article 85859, pp. 1-9.

Leshem, et al., "A Low Complexity Coordinated FEXT Cancellation for VDSL." ICECS, Dec. 2004, pp. 338-341.

Louveaux, et al., "Adaptive DSL Crosstalk Precancellation Design Using Low-Rate Feedback From End Users," IEEE Signal Processing Letters, vol. 13, No. 11, pp. 665-668, Nov. 2006.

Louveaux et al., "Error Sign Feedback as an Alternative to Pilots for Tracking of FEXT Transfer Functions in Downstream VDSL," EURASIP Journal Applied Signal Processing, Article ID 94105 vol. 2006; Aug. 2005, pp. 1-14.

Sjoberg, et al., "G.vdsl: Using Orthogonal Pilot Sequences for Assisting FEXT Channel Estimation in Vector Transmission", Upzide Labs, ITU SD-036, San Diego, California Jan. 15-19, 2007.

Tsiaflakis, et al., "Partial Crosstalk Cancellation in a Multi-User xDSL Environment," Proceedings of IEEE International Conference on Communications (ICC '06), vol. 7, pp. 3264-3269, Istanbul, Turkey, Jun. 2006.

Wiese, et al., "Programmable Implementation of xDSL Transceivers", IEEE Communication Magazine, vol. 38, Issue 5, May 2000.

S. Jagannathan et al, "Spatial Noise Cancellation using Extra Wirepairs in the DSL Downstream", NIPP-NAI-2006-129R1, Vancouver, BC, Canada, Oct. 9-12, 2006.

M. Tsatsanis, "Vectoring techniques for multi-line 10MDSL systems," T1E1.4 committee, contribution 2002-196, Aug. 2002.

G. Ginis et al, "Alien crosstalk cancelation for multipair DSL", EURASIP journal on applied signal processing, vol.-2006, p. 1-12.

G. Ginis and J. Cioffi, "Vectored transmission for digital subscriber line systems", IEEE Journal on Selected Areas of Communications, vol. 20, No. 5, Jun. 2002, pp. 1085-1104.

* cited by examiner

Performance

FIG. 7

- Total Users = 5, Vectored Users = 3, Alien Users = 2
- Coupling matrix in dB $$D_{dB} = \begin{bmatrix} 0 & 29.8 & 22.0 & 10.8 & 8.8 \\ 30.4 & 0 & 11.8 & 5.8 & 34.6 \\ 22.5 & 13.2 & 0 & 12.7 & 25.6 \\ \hline 17.0 & 27.4 & 18.6 & 0 & 42.1 \\ -5.9 & 15.3 & 19.9 & 9.3 & 0 \end{bmatrix} \begin{matrix} \text{Vectored Group} \\ \text{Aliens} \end{matrix}$$

|  | User1 | User2 | User3 |
|---|---|---|---|
| PURE AWGN SNR | 64.22 | 64.03 | 64.18 |
| PRE-SELF FEXT CANCELLER SNR | 45.59 | 43.85 | 48.60 |
| POST-SELF FEXT CANCELLER SNR | 45.72 | 44.79 | 51.29 |
| POST LMS ALIEN CANCELLER SNR (4950 BITS, START WITH 0) | 49.77 | 56.33 | 63.40 |
| CRAMER-RAO LOWER BOUND (CRLB) BASED SNR | 50.03 | 56.41 | 63.4 |

COOPERATIVE MIMO FOR ALIEN NOISE CANCELLATION (COMAC) FOR UPSTREAM VDSL SYSTEMS

BACKGROUND

Digital subscriber line (DSL) implementations, including very high speed digital subscriber line (VDSL) implementations may be utilized as a last mile solution for high speed data communications. While such technologies have increased the data exchange rate between a customer and a central office, such implementations may experience noise that affects the data transmission rate. More specifically, VDSL implementations may be impaired by any number of disturbances, including self-crosstalk, impulse noise, alien noise, etc.

SUMMARY

Included are embodiments for reducing alien crosstalk. At least one embodiment of a method includes receiving noise data associated with a first user signal on a first tone, receiving noise data associated with a second user signal on the first tone, and receiving at least one alien crosstalk canceller coefficient for the first user on the first tone. Some embodiments include applying the at least one alien crosstalk canceller coefficient to the second user signal to reduce alien crosstalk for the first user signal.

Also included are embodiments of a system. At least one embodiment of a system includes a first receiving component configured to receive noise data associated with a first user signal on a first tone, a second receiving component configured to receive noise data associated with a second user signal on the first tone, and a third receiving component configured to receive at least one alien crosstalk canceller coefficient for the first user on the first tone. Some embodiments include an applying component configured to apply the at least one alien crosstalk canceller coefficient to the second user signal to compute a correction signal for the first user and a reducing component configured to combine the correction signal for the first user and the first user signal to reduce alien crosstalk into the first user signal.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 7 depicts an exemplary embodiment of a performance table, indicating gains that may be achieved in utilizing one or more noise cancellation techniques, such as in the network from FIG. 1.

DETAILED DESCRIPTION

Figure 1:
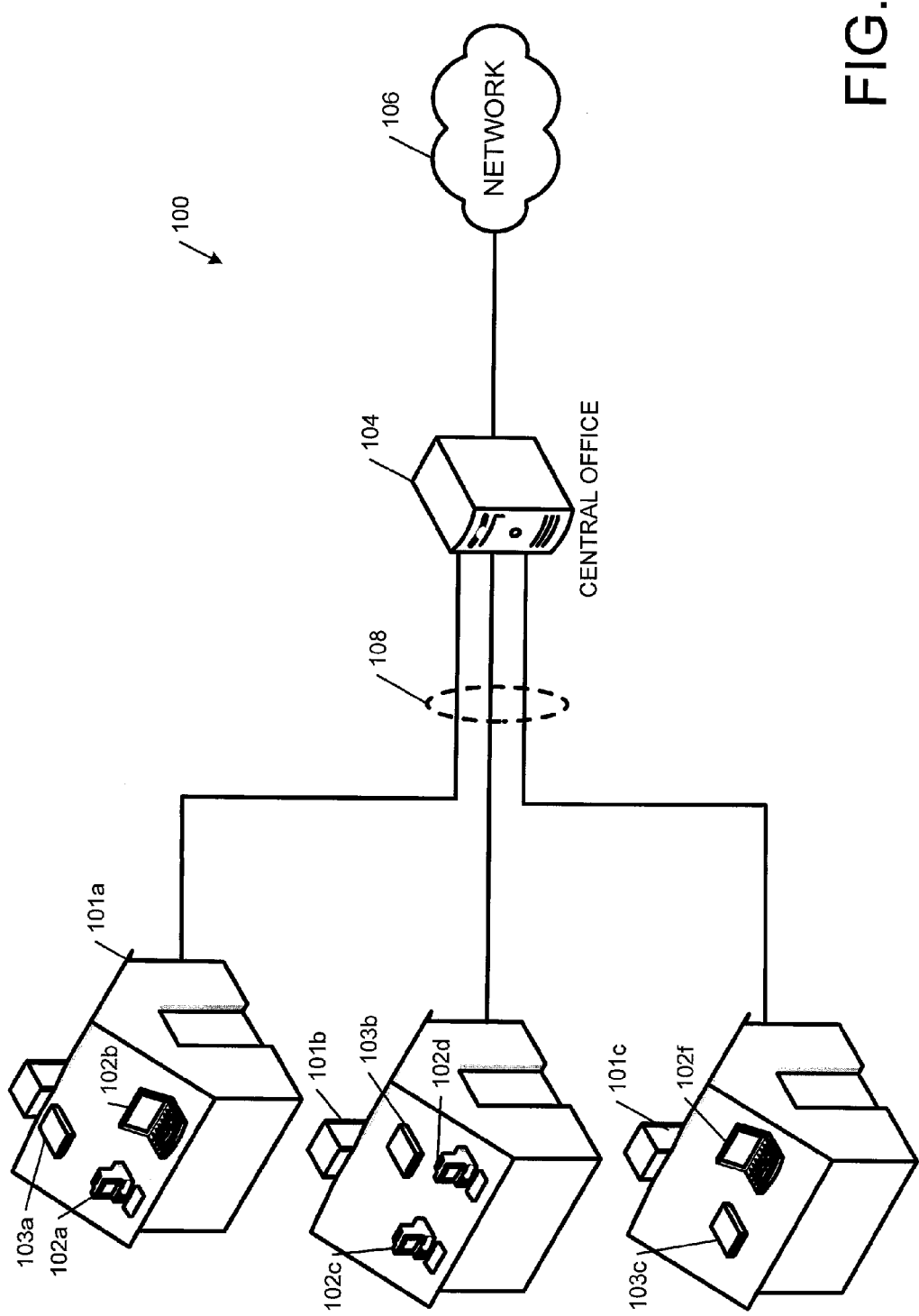
FIG. 1 depicts an exemplary embodiment of a network diagram, which may be configured for communicating data.

Dynamic spectrum management level 3 (DSM3) is an initiative taken to mitigate the limitations posed by self-FEXT in DSL environments. DSM3-compliant devices may be configured to use signal cooperation (e.g., signal vectoring) at a central office (CO), and employ CO-centric processing. However, alien-crosstalk mitigation, in both upstream and downstream directions, may not fall under the purview of the DSM3 standard.

Alien crosstalk may include an additive noise (apart from the additive Gaussian thermal noise) at a receiver device of vectored users in a VDSL DSM3 configuration. Alien crosstalk may stem from the services outside the vectored system that share the same cable. This additive noise may decrease the achievable capacity for the VDSL. Owing to the inception of the noise from the same sources, the alien noise experienced at the receivers of the different vectored users exhibits correlation. The vectored VDSL configuration may not have access to the transmitted or received data of the alien disturbance sources. Nevertheless, in the upstream direction (client to central office), the vectored VDSL configuration can take advantage of simultaneous access to the received signals of vectored users at the CO to effectively mitigate alien crosstalk.

At least one embodiment discussed herein addresses alien crosstalk mitigation in the upstream direction for a vectored group of VDSL users. Similarly, some embodiments employ a software and/or hardware based low complexity and adaptive alien-crosstalk canceller that may be initialized, engaged, and adapted non-disruptively while the vectored users operate in data mode.

Similarly, embodiments of the alien-crosstalk canceller may be configured to leverage the correlation across vectored users that is present in the additive noises on each tone. This may be accomplished by directly acting on error signals that include alien-crosstalk. Similarly, in some embodiments, at the central office, this alien cancellation methodology may be applied subsequent to the self-FEXT cancellation algorithm that mitigates the self-far end cross talk (self-FEXT, which is FEXT originating from users within the vectored group). Similarly, in some embodiments, initialization and/or engagement of the alien canceller may be performed during a warming-up phase of the VDSL line (pre-data-mode), in conjunction with a corresponding pre-data-mode self-FEXT canceller initialization.

Further, some embodiments may be configured to process signals on a per-tone basis, which may be justified since such a configuration may be dedicated to DMT modulated implementations. Such an implementation may be configured to mitigate the error signal of one or more tones across multiple channels, where the error is computed at the output of the slicer subsequent to frequency-domain equalization and self-FEXT cancellation.

Additionally included are embodiments of a blind whitening algorithm for alien cross talk mitigation, which may be configured to operate on the residual errors at the output of the slicer subsequent to frequency-domain equalization and self-FEXT cancellation. Such embodiments may be configured with a low complexity by virtue of not requiring any matrix factorization or inversion which is typically employed by previously suggested solutions. Similarly, some embodiments may be configured without the need for modifications to current hardware.

In implementation, after undergoing self-FEXT cancellation, received symbols in the frequency domain may be infected with a mixture of the alien-noise and the white Gaussian noise. In many VDSL environments, the bit-loading may be designed such that a bit error rate (BER) a every tone stays at or below $10^{-4}$(31 7), even when the signal to-noise-ratio SNR on the tone is lowered by an amount equal to the noise margin (e.g., nominally 6 dB). Thus, when the bit-loading is primarily based on the signal-to-noise ratio (SNR) at the output of the self-FEXT canceller (coding gain being ignored), the residual error vector can be evaluated using an estimate of the transmitted symbol for each vectored user at the output of the self-FEXT canceller. Each element of the residual error vector may contain the additive white Gaussian noise (AWGN) at the receiver as well as the alien cross-talk. The variance of residual error for each user may be concurrently minimized by removing the correlation in the alien cross-talk.

To facilitate non-disruptive operation in data-mode, at least one embodiment may be configured with a linear recursion for the above cancellation scheme. For each of the N vectored users (where N can be any integer), a stochastic gradient based algorithm may be used to adaptively estimate the N−1 coefficients of the alien-canceller that operate on the residual errors of the remaining users computed prior to alien-crosstalk cancellation (e.g., at the output of the self-FEXT canceller). The stochastic update paradigm is described below and facilitates operation of the software alien canceller in the data mode. Additionally, the update paradigm may be configured to adapt the canceller in a changing noise environment and/or when new users join or leave the vectored group.

The alien-crosstalk canceller may be inserted into operation (engaged) with an initial null canceller and/or with an initial estimate based on the iterative estimation described in equation below. Similar to the adaptations with the canceller in operation, the iterative estimation during initialization may also be based on the stochastic gradient paradigm and may not require any matrix inversion or factorization. However, one may note that during the initial iterative estimation, the alien-crosstalk canceller may not be in active operation.

Engaging the alien-crosstalk canceller followed by the least mean square (LMS) adaptations of the canceller may result in an improvement of the SNR at the output of the alien-crosstalk canceller. An example of the possible SNR improvements due to alien-crosstalk cancellation obtained via simulations is presented in FIG. 7, discussed in more detail below. The improvement in SNR at the output of the alien-crosstalk canceller can be translated to an increased data-rate by relying on a seamless-rate-adaptation (SRA) mechanism that may be utilized in VDSL systems; thus triggering an SRA due to an improvement in SNR results in a new bit-loading table computation.

One should note that once the new bit-loading table is computed based on the improved SNR due to the alien-crosstalk cancellation, the bit-error rate based on the received signal on a tone at the output of the self-FEXT canceller (e.g., the input to the alien-crosstalk canceller) is no longer guaranteed to be always below $10^{-4}$(−7). In other words, the residual error at the output of the self-FEXT canceller may no longer be guaranteed to be reliable. This phenomenon may limit the realistic improvement in SNR to a value equal to the noise-margin of the system (nominally 6 dB).

Embodiments disclosed herein may be utilized in discrete multitone (DMT) modulated systems and is per-tone based, where the frequency domain error signal for one particular tone may be processed across multiple channels (users).

Referring now to the drawings, FIG. 1 depicts an exemplary embodiment of a network diagram 100, which may be configured for communicating data. As illustrated in the non-limiting example of FIG. 1, users may subscribe to digital subscriber line (DSL) services, such as very high speed DSL (VDSL) and receive these services at a customer premises 101a, 101b, and 101c. The customer premises 101 may include one or more customer premises equipment (CPE) 102a-102f. The CPE 102a, 102b may be located at customer premises 101a and may be coupled to a single DSL account, however this is not a requirement. Similarly, the CPE 102c, 102d may be located and/or associated with customer premises 101b. The CPE 102e may be associated with customer premises 101c.

Additionally, the CPE 102 may be coupled to a DSL modem 103a, 103b, 103c or other CPE (not shown). The DSL modem 103 may be configured as a recipient and/or provider of information between the CPE 102 and a central office (CO) 104. The central office 104 may include any equipment and/or logic configured to provide and/or receive data from the customer premises equipment 102, 103. More specifically, the central office 104 may include a DSL access multiplexor (DSLAM), server, personal computer, and/or other equipment. The central office 104 may also be coupled to a network 106. The network 106 may include the Internet, a public switched telephone network (PSTN), an integrated services digital network (ISDN) or other wide area network or local area network. Similarly, while the components of FIG. 1 are illustrated as wireline components, wireless devices may be implemented for one or more of these components.

As discussed above, such a configuration of wireline components may introduce alien crosstalk among cables, indicated at ellipse 108. More specifically, the cables between the customer premises 101 and the central office 104 may include lines for a plurality of communications protocols. As a non-limiting example, DSL may be included, as well as a telephone line, and/or other lines. In such a configuration, alien crosstalk may affect the DSL data in another cable. As discussed above, such alien crosstalk may reduce the quality of communicated data and/or reduce speed of transmission.

Figure 2:
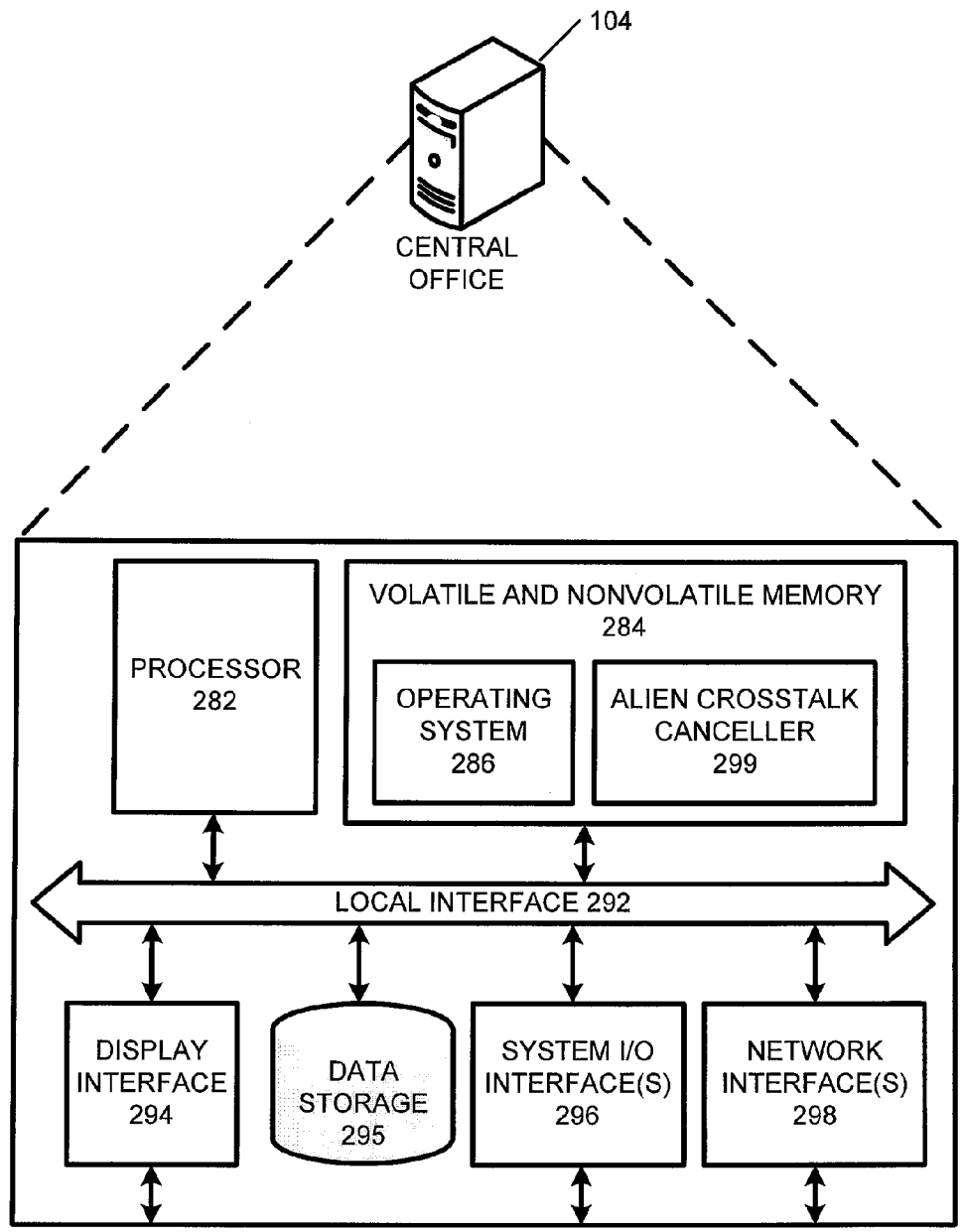
FIG. 2 depicts an exemplary embodiment of a central office, which may be configured for facilitating communication in the network from FIG. 1.

FIG. 2 depicts an exemplary embodiment of a central office, which may be configured for facilitating communication in the network from FIG. 1. As illustrated in FIG. 2, in terms of hardware architecture, the central office 104 may include a processor 282, a memory component 284, a display interface 294, a data storage component 295, and one or more input and/or output (I/O) device interface(s) 296 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a hardware device for executing software, particularly software stored in the memory component 284.

The processor 282 can be any custom made or commercially available processor, a central processing unit (CPU), an auxiliary processor among several processors associated with the central office 104, a semiconductor based microprocessor (in the form of a microchip or chip set), a macroprocessor, or generally any device for executing instructions.

The memory component 284 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory component 284 may incorporate electronic, magnetic, optical, and/or other types of storage media. One should note that the memory component 284 can also have a distributed architecture, where various components are situated remotely from one another, but can be accessed by the processor 282.

The software in the memory component 284 may include one or more separate programs, each of which includes an ordered listing of executable instructions for implementing logical functions. In the example of FIG. 2, the software in the memory component 284 may include an alien crosstalk canceller 299, as well as an operating system 286. Additionally, the alien crosstalk canceller 299 may include a first receiving component configured to receive a noise value associated with a first user signal and a second receiving component configured to receive a noise data associated with at least one other user signal. Further, depending on the particular configuration, the crosstalk canceller may also include a first determining component configured to determine at least one alien crosstalk canceller coefficient for the first user and an applying component configured to apply the at least one alien crosstalk canceller coefficient to the first user signal to reduce alien crosstalk. More specifically, the alien crosstalk canceller coefficient for user 1 may be applied (e.g., multiplied) with the noise signal of the other users and then subtracted from the noise signal of user 1. Other components may also be included.

Additionally, while the logic components 286, 299 are each illustrated in this nonlimiting example as a single piece of logic, these components can include one or more separate software, hardware, and/or firmware modules. Similarly, one or more of these logical components can be combined to provide the desired functionality. Additionally, the operating system 286 may be configured to control the execution of other computer programs and may be configured to provide scheduling, input-output control, file and data management, memory management, and communication control and related services.

A system component embodied as software may also be construed as a source program, executable program (object code), script, and/or any other entity that includes a set of instructions to be performed. When constructed as a source program, the program is translated via a compiler, assembler, interpreter, or the like, which may or may not be included within the volatile and nonvolatile memory 284, so as to operate properly in connection with the operating system 286.

The input/output devices that may be coupled to system I/O interface(s) 296 may include input devices, for example but not limited to, a keyboard, mouse, scanner, microphone, camera, proximity device, receiver, etc. Further, the input/output devices may also include output devices, for example but not limited to, a printer, display, transmitter, etc. The input/output devices may further include devices that communicate both as inputs and outputs, for instance but not limited to, a modulator/demodulator (modem for accessing another device, system, or network), a radio frequency (RF) or other transceiver, a telephonic interface, a bridge, a router, WIFI communications device, WiMAX communications device, bluetooth communications device, etc. Similarly, a network interface 298, which is coupled to local interface 292, can be configured to communicate with a communications network, such as the network 100 from FIG. 1. While this communication may be facilitated via the central office 104, this is not a requirement.

More specifically, the network interfaces 298 may be configured for facilitating communication with one or more other devices. The network interface 298 may include any component configured to facilitate a connection with another device. While in some embodiments, among others, the central office 104 can include the network interface 298 that includes a Personal Computer Memory Card International Association (PCMCIA) card (also abbreviated as "PC card") for receiving a wireless network card, this is a nonlimiting example. Other configurations can include the communications hardware within the client device 102, such that a wireless network card is unnecessary for communicating wirelessly. Similarly, some embodiments may include the network interfaces 298 for communicating via a wired connection. Such interfaces may be configured with universal serial bus (USB) interfaces, serial ports, and/or other interfaces. In operation, the wireless network interfaces 298 may be configured to communicate with other CPEs 102, 103, and other wireless devices via a wireless local area network (WLAN) or other wireless network.

If the central office 104 includes a personal computer, workstation, or the like, the software in the memory component 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the central office 104 is activated.

When the central office 104 is in operation, the processor 282 can be configured to execute software stored within the memory component 284, to communicate data with the memory component 284, and to generally control operations of the central office 104 pursuant to the software. Software in memory 284, in whole or in part, may be read by the processor 282, perhaps buffered within the processor 282, and then executed. Additionally, one should note that while the above description is directed to a central office 104, other devices can also include the components described in FIG. 2.

One should note that the CPEs 102, 103 can be configured with one or more of the components and/or logic described above with respect to the central office 104. Additionally, the CPEs 102, 103, the central office 104, and/or other components of FIG. 1 can include other components and/or logic for facilitating the operations described herein. Additionally, depending on the particular configuration, the central office 104 may include both a wireless interface for communicating with CPEs 102, 103 and a second interface for communicating with the network 106. The central office 104 may be combined with other network services, depending on the particular configuration.

Figure 3:
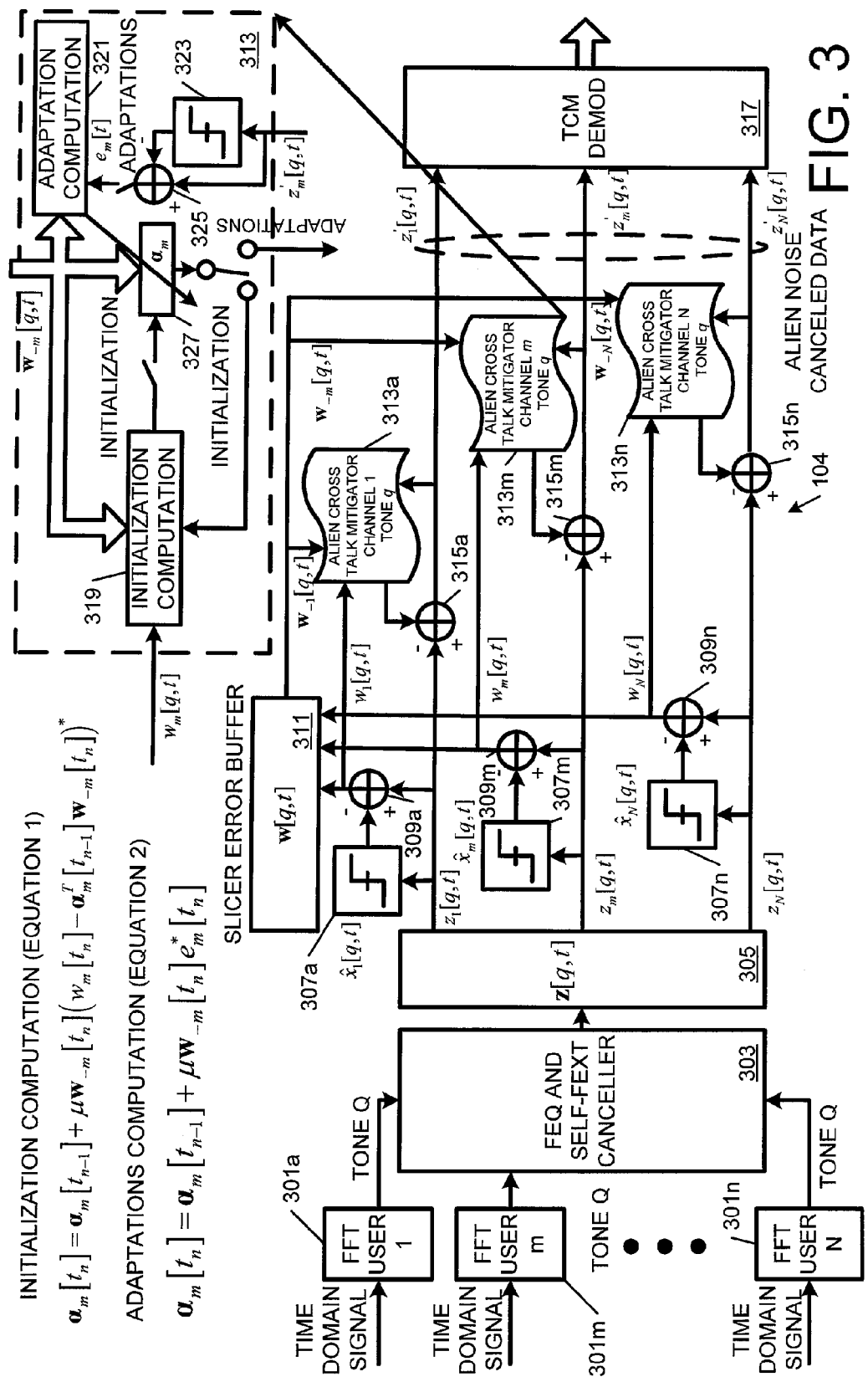
FIG. 3 depicts an exemplary embodiment of logic for the alien crosstalk canceller that may be implemented at the central office, as illustrated in FIG. 2.

FIG. 3 depicts an exemplary embodiment of logic that may be implemented at the central office, as illustrated in FIG. 2. More specifically, the central office 104 may receive a time domain signal from the CPEs 102, 103, each time domain signal associated with a user (e.g., users 1, m, and N, where "m" and "N" can be any integer used to indicate that data may be received from a plurality of users). The central office 104 can perform a fast Fourier transform (FFT) 301a, 301m, 301n on the received signals, to transform the signals into a frequency domain signal at tone q (where tone q is a predetermined frequency). A frequency-domain equalizer (FEQ) and a self-far end crosstalk (self-FEXT) cancellation may be performed on the frequency domain signals at FEQ and self-FEXT canceller 303. This produces signals $z_1[q,t], z_m[q,t], z_N[q,t]$ (grouped together as $z[q,t]$) for each of the received signals (block 305). This is done for all the tones in the VDSL system.

The respective signals $z_1[q,t], z_m[q,t], z_N[q,t]$ may then be analyzed to generate $\hat{x}_1[q,t], \hat{x}_m[q,t], \hat{x}_N[q,t]$, the estimates of the signals transmitted from the CPEs 102, 103 (see 307a, 307m, 307n). The transmitted signal estimates $\hat{x}_1[q,t]$, $\hat{x}_m[q,t], \hat{x}_N[q,t]$ can be subtracted from $z_1[q,t], z_m[q,t]$, $z_N[q,t]$ at adder 309a, 309m, 309n to provide the slicer errors $w_1[q,t]$, $w_m[q,t]$, $w_N[q,t]$. The slicer errors are sent to a slicer error buffer 311, as well as to alien crosstalk mitigators 313a, 313m, and 313n. The slicer error buffer 311 may also be configured to send a subset of the slicer errors to the alien crosstalk mitigators 313. The alien crosstalk mitigator for the user m 313m (as illustrated in the exploded view) can receive the slicer errors $w_m[q,t]$ and $w_{-m}[q,t] = (w_1[q,t] \ldots w_{m-1}[q,t]$ $w_{m+1}[q,t] \ldots w_N[q,t])^T$ at an initialization computation component 319, where T represents the matrix transpose operator. The initialization computation component 319 may be configured to implement an initialization computation, such as described below. The result from this computation is the initialization coefficient for user m and is a vector labeled as $\alpha_m$ and stored in a component 327 (when the alien crosstalk mitigator is set in initialization mode). One should note that, while slicer errors are provided in this nonlimiting example, any noise data may be provided.

Similarly, the slicer error $w_{-m}[q,t]$ may be sent to an adaptation computation component 321. The alien crosstalk mitigator 313m may also be configured to receive alien canceled signal $z'_m[q,t]$ in a feedback loop. A transmitted signal may be estimated at block 323 and may be subtracted from the alien canceled signal $z_m[q,t]$ (block 325). The resulting signal ($e_m[q,t]$) is sent to the adaptation computation component 321. The adaptation computation component 321 may be configured to implement an adaptations computation, as described below. The resulting data comprise the adaptation coefficients and may be sent to the $\alpha_m$ component 327. The alien crosstalk mitigator 313m may also be configured to apply the adaptation coefficients $\alpha_m$ to the slicer error of the other users $w_{-m}[q,t]$ via a scalar product operation ($\alpha_m^T w_{-m}[q,t]$) to generate a resulting signal which may be subtracted from the original signal $z_m[q,t]$ to yield the alien canceled signal $z'_m[q,t]$. The alien canceled signals $z'_1[q,t], z'_m[q,t], z'_N[q,t]$ from the alien crosstalk mitigator 313 may be sent to a trellis coded modulation (TCM) demodulator 317 for demodulation.

More specifically, in operation, the exemplary embodiment of FIG. 3 may be described below. FIG. 3 illustrates a schematic of the suggested blind alien-cross talk cancellation algorithm for a specific tone q. One may let z denote the N×1 received symbol vector on tone q post self-FEXT cancellation, x denote the N×1 transmitted symbol vector from the CPEs on tone q and w the N×1 noise data on tone q. Assuming that the self-FEXT is completely cancelled, Equation (1) may yield:

$$z = x + w \quad (1)$$

In a system with R alien disturbers. One may let A denote the N×R alien coupling matrix for tone q and $\phi$ denote the R×1 alien symbol transmitted vector on tone q. The noise data w may be infected with the AWGN (denoted as v) and alien-cross talk and therefore, its elements $w_m$ may be correlated. Therefore, equation (2) may yield:

$$w = v + A\phi \quad (2)$$

In at least one exemplary embodiment, the alien disturbers may transmit with substantially the same power, $E[\phi\phi^h] = \rho^2 I$ and similarly for the AWGN noise, $E[vv^h] = \sigma_v^2 I$. Therefore, the total noise for a $m^{th}$ channel and its variance $\sigma_{bac,m}^2$ (the subscript bac denotes before-alien-canceller) may be given by the following equations:

$$w_m = v_m + a_m^T \phi \quad (3)$$

$$\sigma_{bac,m}^2 = E[w_m w^*_m] = \sigma_v^2 + \rho^2 \|a_m\|^2 \quad (4)$$

Here, $a_m^T$ is the $m^{th}$ row of the Alien coupling matrix A. One may define $\hat{x}$=demapped(z), that is the sliced output of the received signal vector on tone q post self-FEXT cancellation. Since the operating BER during the data-mode in the VDSL may be $10^{-7}$, one can assume that $\hat{x}$ acts as a reliable estimate of the actual transmitted symbol x.

Since, $w_m$, $1 \leq m \leq N$ may be correlated, one may find a (N−1)×1 vector $\alpha_m$ such that the resulting variance $\sigma_m^2 = \text{var}(w_m - w_{-m}^T \alpha_m)$ is minimized for user m. The optimal $\alpha_m$ using the orthogonality principle is given by Equation (5):

$$\alpha_m^{opt} = \Gamma_{-m}^{-1} p_m \quad (5),$$

where, $\Gamma_{-m} = E[w^*_{-m} w_{-m}^T]$, is the noise covariance matrix of all the users except, user m, $p_m = E[w_m w^*_{-m}]$ and $w_{-m}[q,t] = (w_1[q,t] \ldots w_{m-1}[q,t] w_{m+1}[q,t] \ldots w_N[q,t])^T$ is an (N−1)×1 noise data comprising of all elements but $w_m$. This linear combination can be done using the following equations:

$$z'_m = z_m - \alpha_m^{(opt)T} w_{-m} \quad (6)$$

The resulting alien cancelled symbol for channel m, $z'_m$ then passes through the TCM demodulation block as shown in the figure. This procedure can be applied concurrently for all the users.

Now, one can evaluate the expected reduction in the noise variance due to the above blind whitening methodology. Substituting the expression for the optimal N−1 dimensional coefficient $a_m^T$ obtained in equation (5) in the expression for variance $\sigma_m^2$ yields the following:

$$\sigma_m^2 = E[(w_m - w_{-m}^T \alpha_m^{(opt)}) w^*_m] \text{ or } \sigma_m^2 = E[|w_m|^2] - p_m^T \Gamma_{-m}^{-1} * p^*_m \quad (7)$$

Hence, the residual total noise (alien+Gaussian) variance post alien-cancellation is given by Equation (8):

$$\sigma_m^2 = \sigma_v^2 + a_m^T (I + \lambda A_{-m}^H A_{-m})^{-1} a^*_m \rho^2, \quad (8),$$

where $$\lambda = \frac{\rho^2}{\sigma_v^2}.$$

The Cramer-Rao lower bound (CRLB) for an estimator of $x_m$, e.g., the minimum achievable variance for an estimator of $x_m$ can be computed as:

$$\text{CRLB}(\hat{x}_m) = \sigma_{bac,m}^2 - p_m^T \Gamma_{-m}^{-1} * p^*_m$$

It is clear from (7) and the above equation that low complexity blind whitening algorithm may be configured to achieve the CRLB.

A linear recursion of the scheme may be utilized, as well. More specifically, Equation (5) utilizes a knowledge of the joint statistics of $\Gamma_{-m}$ and $p_m$. In seeking to avoid the need to learn these statistics before estimating the optimal $\alpha_m$, one can replace the equation (5) by an iterative method of estimating $\alpha_m$ by using the stochastic gradient approach. As an error vector $w[t_n]$ at DMT symbol index $t_n$ is received, $\alpha_m[t_n]$ is updated in the direction opposite of the gradient of the instantaneous quadratic error subsequent to applying the canceller, $\|e_m[t_n]\|^2$ where $$e_m[t_n] = z'_m[t_n] - \text{demapped}(z'_m[t_n]) \quad (9)$$

The above principle gives the following recursion for the channel m $$\alpha_m[t_n] = \alpha_m[t_{n-1}] + \mu w_{-m}[t_n] e^*_m[t_n] \quad (10)$$

The stochastic update paradigm described in Equation (10) may allow for operation of the software alien canceller in the data mode and also adapt the canceller in a changing noise environment or when new users join or leave the vectored group. The alien-crosstalk canceller may be inserted into operation (engaged) with an initial null canceller, or alternatively, with an initial estimate based on the iterative estimation described in Equation (11):

$$\alpha_m[t_n] = \alpha_m[t_{n-1}] + \mu w_{-m}[t_n](w_m[t_n] - \alpha_m^T[t_{n-1}] w_{-m}[t_n])^* \quad (11).$$

Just like the adaptations with the canceller in operation Equation (10), the iterative estimation during initialization Equation (11) may also be based on the stochastic gradient paradigm and does not require any matrix inversion or factorization. However, one may note that during the initial iterative estimation described by Equation (11), the alien-crosstalk canceller is not in active operation.

Figure 4:
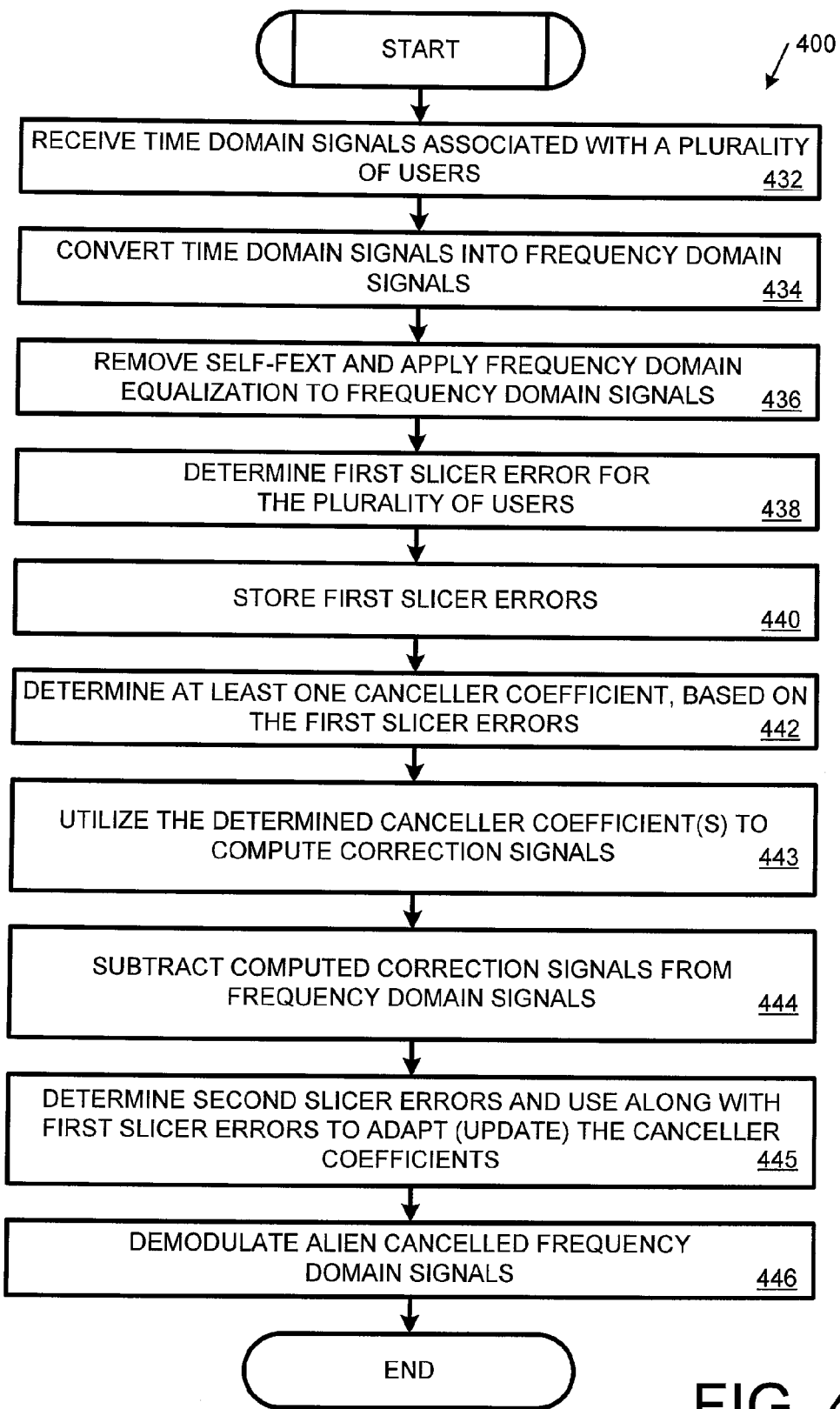
FIG. 4 depicts an exemplary embodiment of a process for reducing alien crosstalk, such as in the network from FIG. 1.

FIG. 4 depicts an exemplary embodiment of a process for reducing alien crosstalk, such as in the network from FIG. 1. As illustrated in the nonlimiting example of FIG. 4, a central office can receive time domain signals associated with a plurality of users (block 432). The time domain signals can be received in a plurality of respective tones and converted into frequency domain signals (block 434). Self-far end crosstalk (FEXT) can be removed and frequency domain equalization can be performed to the frequency domain signals (block 436). A first slicer error can be determined for the plurality of users (block 438). The first slicer error can be stored (block 440). At least one canceller coefficient can be determined, based on the received converted signals and the first slicer errors (block 442). More specifically, in at least one exemplary embodiment, noise data may be exchanged for each user for the mitigation of the residual noise. The determined canceller coefficient(s) can, in some embodiments be used to compute correction signals (block 443). Similarly, in some embodiments, the computed correction signals can be subtracted from the frequency domain signals (block 444). Additionally, second slicer errors can be determined and used along with the first slicer errors in an adaptation function to update the canceller coefficients (block 445). The corrected frequency domain signals can then be demodulated (block 446).

Figure 5:
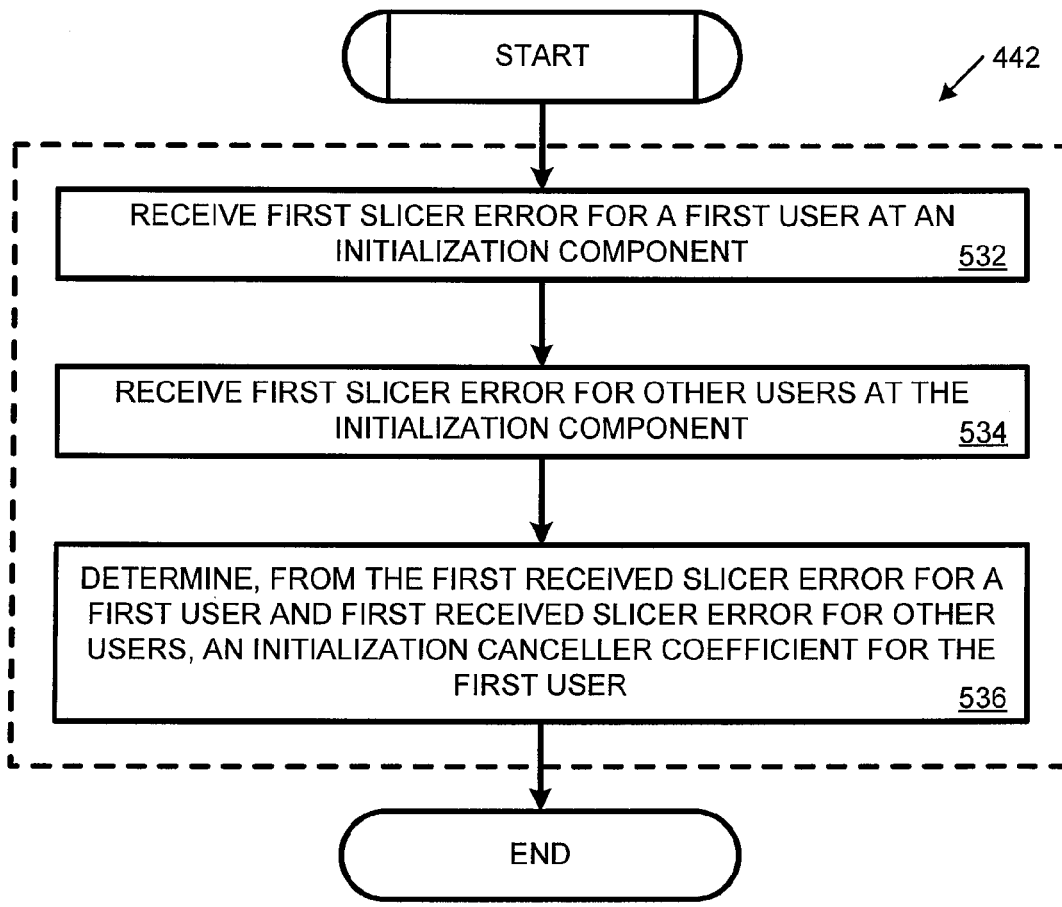
FIG. 5 depicts an exemplary embodiment of a process for initialization, similar to the process from FIG. 4.

FIG. 5 depicts an exemplary embodiment of a process for initialization, similar to the process from FIG. 4. As illustrated in the nonlimiting example of FIG. 5, the process block 442 from FIG. 4 is expanded. More specifically, in determining the canceller coefficient, the first slicer error may be received for a first user at an initialization component 319 (block 532). Additionally, the first slicer error for other users may be received at the initialization component 319 (block 534). Further, an initialization canceller coefficient for the first user can be determined from the first received slicer error for the first user and the first received slicer error for the other users (block 536).

Figure 6:
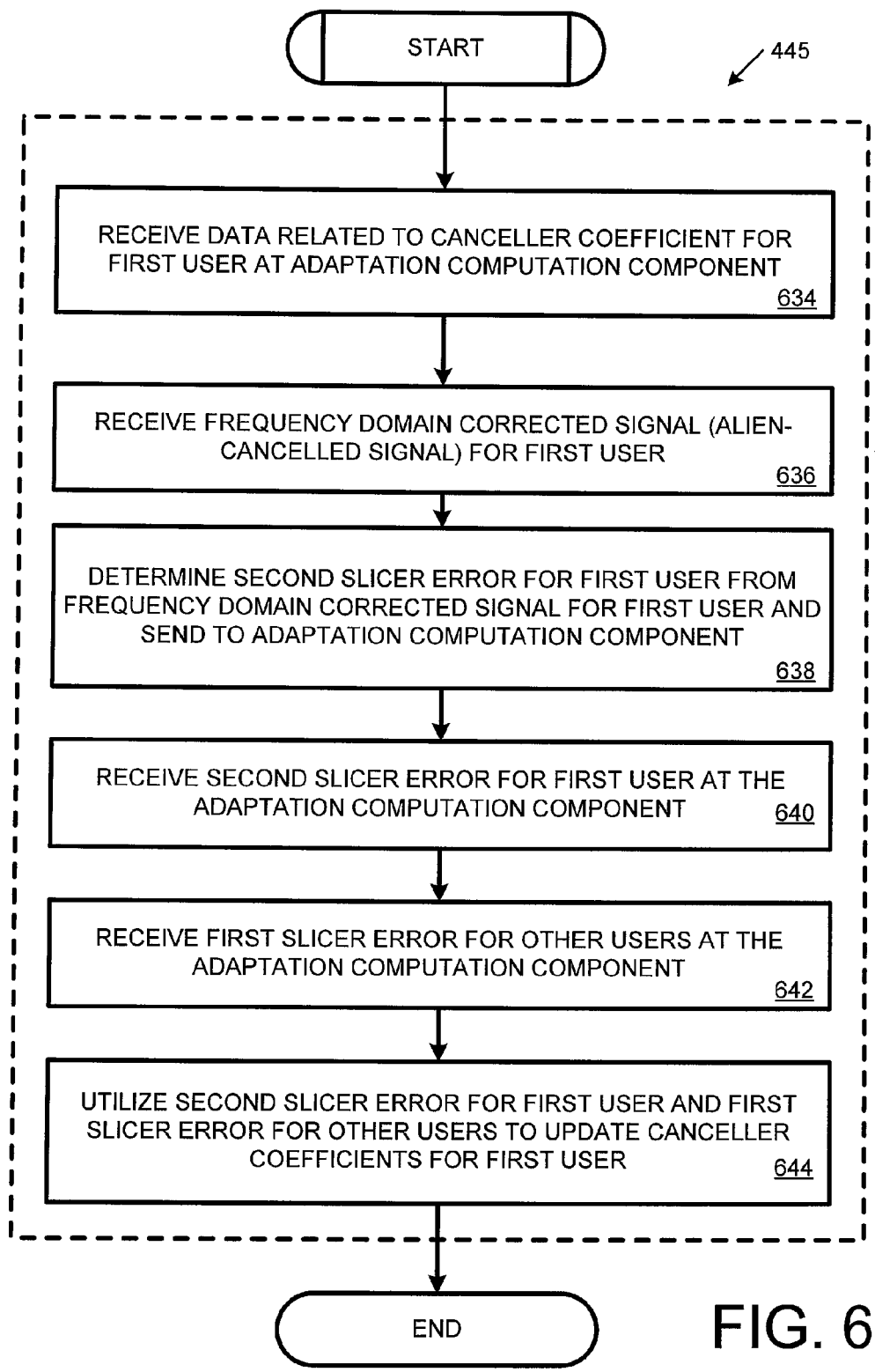
FIG. 6 depicts an exemplary embodiment of a process, for adaptation, similar to the process from FIG. 4.

FIG. 6 depicts an exemplary embodiment of a process of adaptation, similar to the process from FIG. 4. Similar to the diagram from FIG. 5, FIG. 6 is an exploded view of block 445 from FIG. 4. More specifically, data related to a canceller coefficient for a first user may be received at the adaptation computation component 321 (block 634). The frequency domain corrected signal (alien-canceled signal) for the first user may be received (block 635). Additionally, the second slicer error for the first user from the frequency domain corrected signal for the first user may be determined and sent to the adaptation computation component 321 (block 638). The second slicer error for the first user may be received at the adaptation computation component 321 (block 640). Similarly, the first slicer error for the other users may be received at the adaptation computation component 321 (block 642). The second slicer error for the first user and the first slicer error for the other users may be utilized to update the canceller coefficients for the first user (block 644).

FIG. 7 depicts an exemplary embodiment of a performance table, indicating gains that may be achieved in utilizing one or more noise cancellation techniques, such as in the network from FIG. 1. As illustrated in the nonlimiting example of FIG. 7, a pure AWGN signal may include a signal to noise ratio (SNR) of 64.22 for a first user, 64.03 for a second user, and 64.18 for a third user. Similarly, prior to canceling self-FEXT, the SNR of a signal may be 45.59 for a first user, 43.85 for a second user, and 48.6 for a third user. After canceling self-FEXT, the SNR for the first user may be improved to 45.72. The SNR for the second user may be improved to 44.79. The SNR for the third user may be improved to 51.29.

While these gains may improve signal quality, utilizing the LMS alien canceller described herein may improve the SNR to 49.77 for the first user, 56.33 for the second user, and 63.40 for the third user. Based on the Cramer-Rao lower bound (CRLB) the highest SNR achievable may be 50.03 for user 1, 56.41 for user 2, and 63.40 for user 3.

Figure 8:
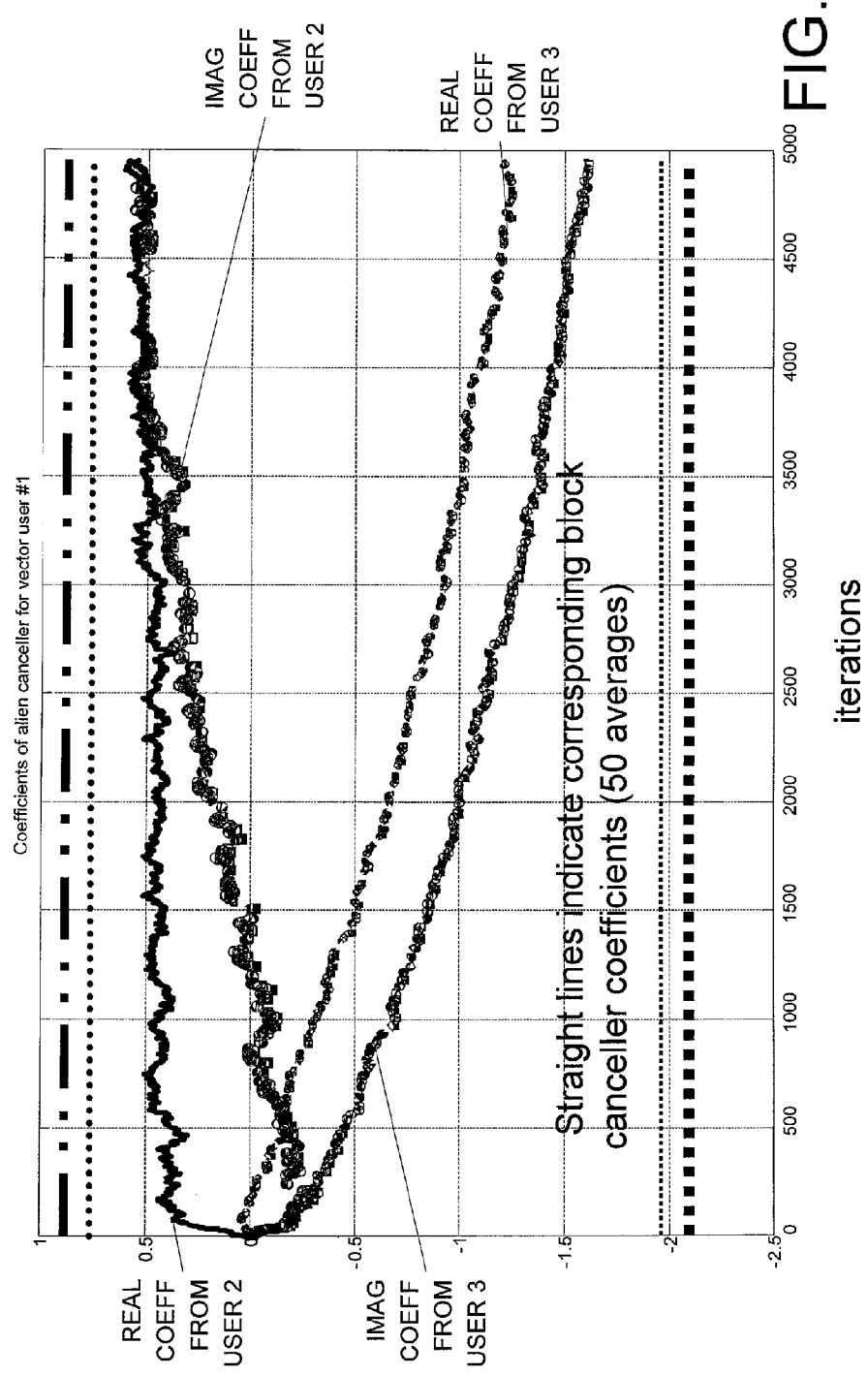
FIG. 8 depicts an exemplary embodiment of a convergence graph, illustrating alien cancellation coefficients convergence via least mean square, for a first user such as in the network from FIG. 1.

FIG. 8 depicts an exemplary embodiment of a convergence graph, illustrating alien cancellation coefficients versus least mean square, such as in the network from FIG. 1. More specifically, the plots in FIG. 8 illustrate real and imaginary canceller coefficients for the first user, with regard to alien noise from two alien users. However, the coefficients correspond to two other users in the vectored group and not the two alien users.

Figure 9:
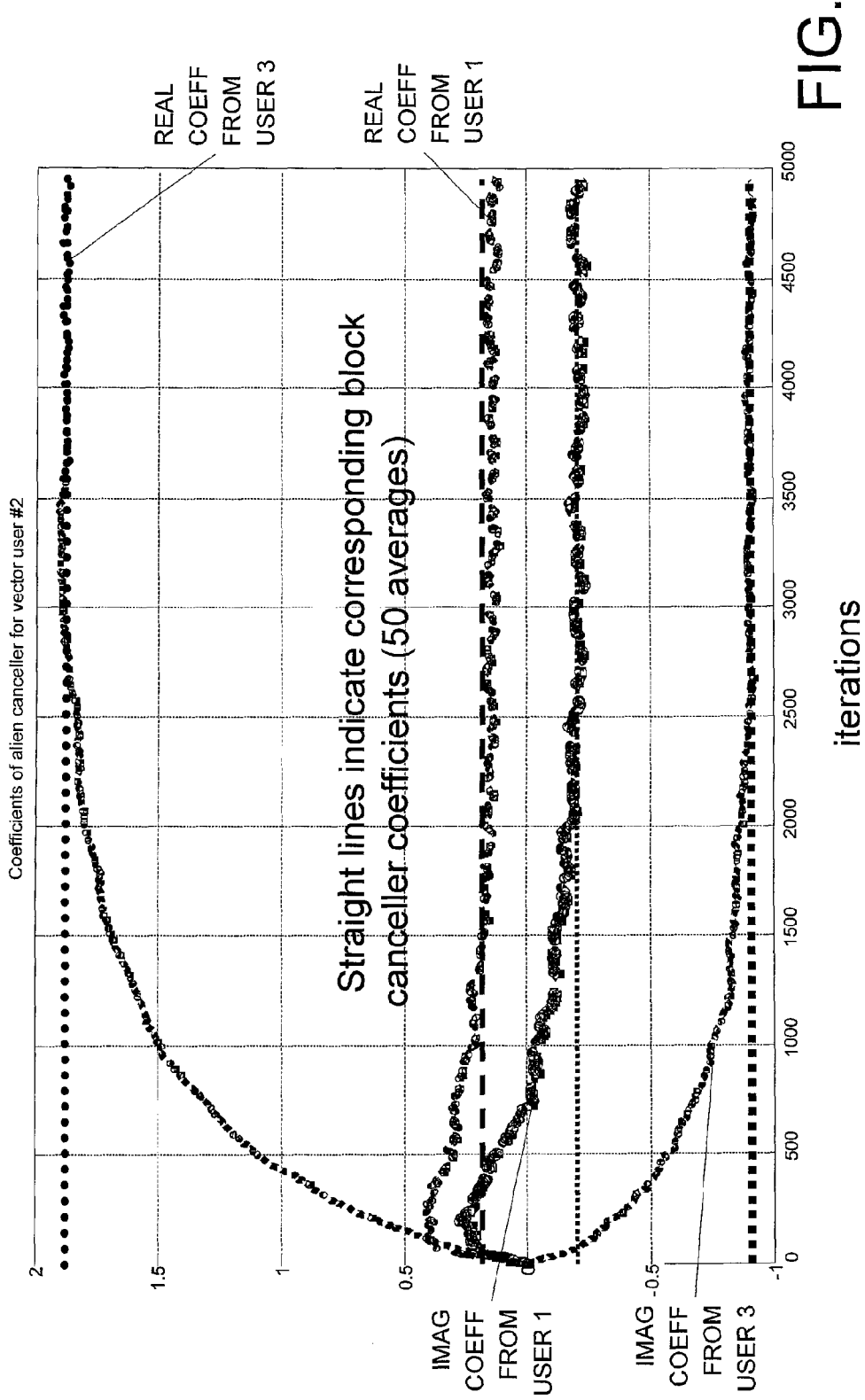
FIG. 9 depicts an exemplary embodiment of convergence of alien cancellation coefficients via least mean square, for a second user, similar to the diagram from FIG. 8.

FIG. 9 depicts an exemplary embodiment of convergence of alien cancellation coefficients via least mean square, for a second user, similar to the diagram from FIG. 8. More specifically, the plots in FIG. 9 illustrate real and imaginary canceller coefficients for the second user, operating on the errors of two other users in the vectored group.

Figure 10:
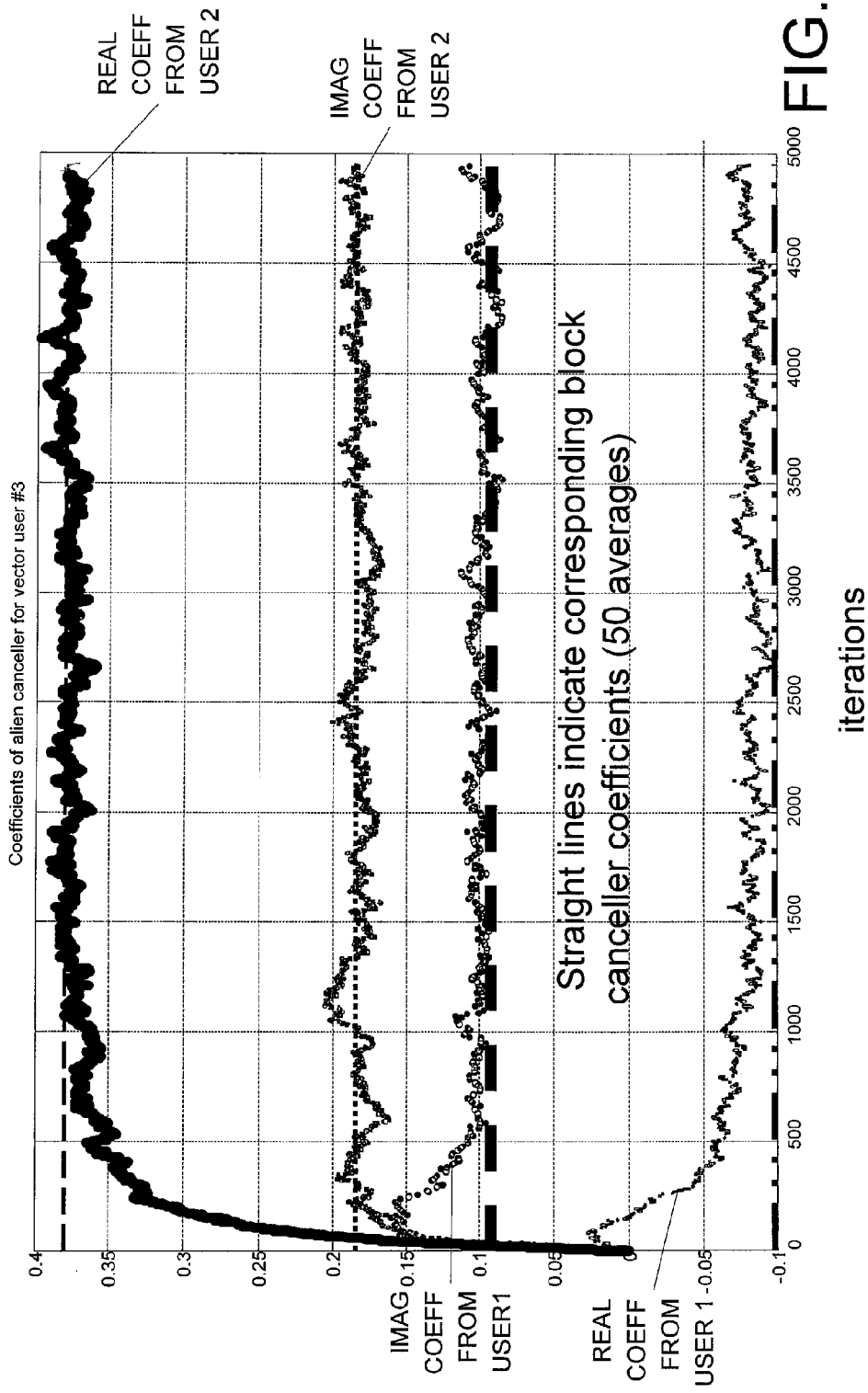
FIG. 10 depicts an exemplary embodiment of convergence of alien cancellation coefficients via least mean square, for a third user, similar to the diagram from FIG. 9.

FIG. 10 depicts an exemplary embodiment of convergence of alien cancellation coefficients via least mean square, for a third user, similar to the diagram from FIG. 9. More specifically, the plots in FIG. 10 illustrate real and imaginary canceller coefficients for the third user, operating on the errors of two other users in the vectored group.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the above described functionality in hardware and/or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method in a digital subscriber line (DSL) system, the method comprising:
   receiving alien noise data associated with a first user signal on a first tone;
   receiving alien noise data associated with a second user signal on the first tone;
   receiving at least one alien crosstalk canceller coefficient for the first user signal on the first tone, wherein the at least one alien crosstalk canceller coefficient is associated with alien noise originated from a service different from the DSL system; and
   applying the at least one alien crosstalk canceller coefficient to the second user signal to reduce alien crosstalk for the first user signal based on the existing correlation between the first user signal on the first tone and the second user signal on the first tone.

2. The method of claim 1, wherein the method is performed in a vectored digital subscriber line (DSL) environment.

3. The method of claim 1, wherein the first user signal and second user signal on the first tone are derived at the output of a frequency-domain equalizer followed by a self-far end crosstalk (self-FEXT) canceller.

4. The method of claim 1, wherein the at least one crosstalk canceller coefficient for the first user is determined using an initialization computation.

5. The method of claim 4, wherein the initialization computation includes implementing at least one of the following functions:

$$\alpha_m^{opt} = \Gamma_{-m}^{-1} p_m \text{ and}$$

$$\alpha_m[t_n] = \alpha_m[t_{n-1}] + \mu w_{-m}[t_n] - \alpha_m^T[t_{n-1}] w_{-m}[t_n])^*$$

wherein $w_m$ denotes the noise associated with the first user signal on the first tone and $w_{-m}$ denotes the noise associated with the second user signal on the first tone.

6. The method of claim 1, wherein the at least one crosstalk canceller coefficient for the first user is updated using an adaptation computation.

7. The method of claim 6, wherein the adaptation computation includes implementing at least one of the following functions:

$$e_m[t_n] = z'_m[t_n] - \text{demapped}(z'_m[t_n]) \text{ and}$$

$$\alpha_m[t_n] = \alpha_m[t_{n-1}] + \mu w_{-m}[t_n] e_m^*[t_n])$$

wherein $z_m'$ denotes the first user signal with reduced alien crosstalk.

8. The method of claim 1, where the noise data associated with the first user signal and the noise data associated with the second user signal comprise the respective slicer errors.

9. The method of claim 1, further comprising reducing the alien crosstalk for at least one of the following: the first user signal and the second user signal.

10. A digital subscriber line (DSL) system, comprising:
    a first receiving component configured to receive alien noise data associated with a first user signal on a first tone;
    a second receiving component configured to receive alien noise data associated with a second user signal on the first tone;
    a third receiving component configured to receive at least one alien crosstalk canceller coefficient for the first user signal on the first tone, wherein the at least one alien crosstalk canceller coefficient is associated with alien noise originated from a service different from the DSL system;

an applying component configured to apply the at least one alien crosstalk canceller coefficient to the second user signal to compute a correction signal for the first user; and a reducing component configured to combine the correction signal for the first user and the first user signal to reduce alien crosstalk into the first user signal based on the existing correlation between the first user signal on the first tone and the second user signal on the first tone.

11. The system of claim 10, wherein the system is configured to operate in a vectored digital subscriber line (DSL) environment.

12. The system of claim 10, wherein the first user signal and second user signal on the first tone are derived at the output of a frequency-domain equalizer followed by a self-far end crosstalk (self-FEXT) canceller.

13. The system of claim 10, wherein the at least one crosstalk canceller coefficient for the first user is determined using an initialization computation.

14. The system of claim 10, wherein the at least one crosstalk canceller coefficient for the first user is updated using an adaptation computation.

15. The system of claim 10, further comprising:

a first determining component configured to determine a slicer error for the first user signal; and a second determining component configured to determine a slicer error for the second user signal.

16. The system of claim 10, wherein the system is implemented as a computer readable medium.

17. A digital subscriber line (DSL) system, comprising:

means for receiving alien noise data associated with a first user signal on a first tone;

means for receiving alien noise data associated with a second user signal on the first tone;

means for receiving at least one alien crosstalk canceller coefficient for the first user signal on the first tone, wherein the at least one alien crosstalk canceller coefficient is associated with alien noise originated from a service different from the DSL system; and means for applying the at least one alien crosstalk canceller coefficient to the second user signal to reduce alien crosstalk into the first user signal based on the existing correlation between the first user signal on the first tone and the second user signal on the first tone.

18. The system of claim 17, wherein the system is implemented in a vectored digital subscriber line (DSL) environment.

19. The system of claim 17, wherein the first user signal and second user signal on the first tone are derived at the output of a frequency-domain equalizer followed by a self-far end crosstalk (self-FEXT) canceller.

20. The system of claim 17, wherein the at least one crosstalk canceller coefficient for the first user is determined using an initialization computation.

21. The system of claim 17, wherein the at least one crosstalk canceller coefficient for the first user is updated using an adaptation computation.

22. The system of claim 17, further comprising:

means for determining a slicer error for the first user signal; and means for determining a slicer error for the second user signal.

23. The method of claim 1, wherein the service different from the DSL system shares a same cable as the DSL system.

24. The system of claim 10, wherein the service different from the DSL system shares a same cable as the DSL system.

25. The system of claim 17, wherein the service different from the DSL system shares a same cable as the DSL system.

* * * * *

UNITED STATES PATENT AND TRADEMARK OFFICE
CERTIFICATE OF CORRECTION

PATENT NO. : 8,300,803 B2  
APPLICATION NO. : 12/100253  
DATED : October 30, 2012  
INVENTOR(S) : Biyani et al.

Page 1 of 1

It is certified that error appears in the above-identified patent and that said Letters Patent is hereby corrected as shown below:

In Column 3, Line 27, delete "$10^{\wedge}(31\ 7)$," and insert -- $10^{\wedge}(-7)$, --, therefor.

In Column 7, Line 49, delete "$z_m[q,t]$" and insert -- $z'_m[q,t]$ --, therefor.

In Column 9, Line 13, delete "$\|e_m[t_n]\|^2$" and insert -- $|e_m[t_n]|^2$ --, therefor.

In Column 12, Line 36, in Claim 5, delete "$\alpha_m[t_n]=\alpha_m[t_{n-1}]+\mu w_{-m}[t_n]-\alpha_m^T[t_{n-1}]w_{-m}[t_n])^*$,"
and insert -- $\alpha_m[t_n] = \alpha_m[t_{n-1}] + \mu w_{-m}[t_n](w_m[t_n] - \alpha_m^T[t_{n-1}]w_{-m}[t_n])^*$ --, therefor.

In Column 12, Line 49, in Claim 7, delete "$+\mu w_{-m}[t_n]e_m^*[t_n])$," and insert -- $+\mu w_{-m}[t_n]e_m^*[t_n]$ --, therefor.

Signed and Sealed this  
Twenty-second Day of January, 2013

David J. Kappos  
*Director of the United States Patent and Trademark Office*